United States Patent [19]

Yamaguchi et al.

[11] Patent Number: 5,032,753
[45] Date of Patent: Jul. 16, 1991

[54] PIEZOELECTRIC TRANSDUCER AND AN ULTRASONIC MOTOR USING THE PIEZOELECTRIC TRANSDUCER

[75] Inventors: Masaki Yamaguchi, Gifu; Shoji Yamada, Chita; Naoto Iwao, Nagoya, all of Japan

[73] Assignee: Brother Kogyo Kabushiki Kaisha, Aichi, Japan

[21] Appl. No.: 485,557

[22] Filed: Feb. 27, 1990

[30] Foreign Application Priority Data

Feb. 28, 1989 [JP] Japan .................................. 1-46868
Jun. 19, 1989 [JP] Japan .................................. 1-156162
Oct. 9, 1989 [JP] Japan .................................. 1-263606

[51] Int. Cl.$^5$ ........................................... H01L 41/08
[52] U.S. Cl. .................................. 310/317; 310/319; 310/321
[58] Field of Search ................ 310/326, 319, 321, 317

[56] References Cited

U.S. PATENT DOCUMENTS

| 2,096,106 | 5/1933 | Guerbilsky | 310/319 |
|---|---|---|---|
| 3,363,117 | 1/1968 | Mondot | 310/317 |
| 3,371,233 | 2/1968 | Cook | 310/317 |
| 3,839,698 | 10/1974 | Ehrlich | 310/317 |
| 4,072,936 | 2/1978 | Spirig | 310/319 |
| 4,122,725 | 10/1978 | Thompson | 310/326 |
| 4,353,004 | 10/1982 | Kleinschmidt | 310/317 |
| 4,588,918 | 5/1986 | Yamamoto et al., | 310/348 |
| 4,743,788 | 5/1988 | Takagi et al. | 310/328 |
| 4,853,579 | 8/1989 | Kawasaki et al. | 310/116 |
| 4,912,351 | 3/1990 | Takata et al. | 310/323 |
| 4,940,914 | 7/1990 | Mizuno et al. | 310/326 |
| 4,952,834 | 8/1990 | Okada | 310/323 |

FOREIGN PATENT DOCUMENTS 0222672  9/1984  Japan .................................. 310/321

Primary Examiner—Mark O. Budd
Assistant Examiner—Thomas M. Dougherty
Attorney, Agent, or Firm—Oliff & Berridge

[57] ABSTRACT

In the piezoelectric transducer, the elastic member vibrates, being excited by the first electromechanical transducing element. The impedance element on the second electromechanical transducing element is adjusted so that the vibration frequency and the resonance frequency of the elastic member should be almost the same. In the ultrasonic motor using the piezoelectric transducer, the vibration having the same frequency as that of the vibration of the elastic member is applied to the elastic member. This applied vibration has a direction differnt from that of the viration of the elastic member. The applied vibration and the vibration of the elastic member form approximate elliptical vibration, thereby rotating the rotor. The piezoelectric transducer of variable structure can control the resonance frequency in a wide range without electric power. The piezoelectric transducer can efficiently transduce applied electricity into approximate elliptical vibration of the elastic member, thereby generating great mechanical drive power. The electromechanical transducing element and the impedance element can compose a simple and compact vibration control unit. Since the electromechanical transcuding element and the impedance element form a closed circuit consuming no electric power, no power source circuit is required. The vibration control unit adjusts the resonance characteristic of the closed circuit, thus quantitatively controlling the frequency distribution and the amplitude of the mechanical vibration.

26 Claims, 11 Drawing Sheets

PIEZOELECTRIC TRANSDUCER AND AN ULTRASONIC MOTOR USING THE PIEZOELECTRIC TRANSDUCER

BACKGROUND OF THE INVENTION

This invention relates to a piezoelectric transducer with an adjustable resonance frequency and to an ultrasonic motor using such a piezoelectric transducer.

In particular, this invention relates to a vibration control unit for controlling mechanical vibration occurring with a mechanical component, and further to a vibration control unit for controlling a frequency distribution, an amplitude and other conditions of mechanical vibration.

Conventionally, an electromechanical transducing element uses an electrostrictive element, a magnetostrictive element or a piezoelectric element, and transduces an electric signal into mechanical vibration, thereby causing ultrasonic vibration. A piezoelectric transducer comprises the electromechanical transducing element provided with a resonator so that ultrasonic vibration with a large amplitude can be obtained.

In the related-art piezoelectric transducer, the configuration and structure of the resonator should be adjusted to obtain suitable resonance frequency for various purposes.

Japan Published Unexamined Application No. 63-125100 proposes a piezoelectric transducer in which the resonance frequency is adjustable. As shown in FIG. 5. in a piezoelectric transducer 50, a control piezoelectric element 54 having a control electrode 53 and a driven piezoelectric element 56 having a driven electrode 55 are stacked on top end of an elastic member 52 functioning also as a ground electrode. An elastic member 58 is arranged via an insulator 57 on top of the driven piezoelectric element 56. The piezoelectric transducer 50 is fastened with a bolt 59 and a nut 60. A direct-current power source 61 with variable voltage is connected to the control electrode 53. On the other hand, the driven electrode 55 is connected via a matching circuit 62 to a drive power source 63. Direct-current voltage from the direct-current power source 61 connected to the control electrode 53 is applied to the control piezoelectric element 54 of the piezoelectric transducer 50. Known piezoelectric elements contract and expand in proportion to applied voltage. Since the control piezoelectric element 54 expands and contracts in proportion to the applied direct-current voltage, the fastening force of the bolt 59 onto the piezoelectric transducer 50 can be optionally adjusted. Consequently, the resonance frequency of the piezoelectric transducer 50 can be varied according to the voltage applied by the direct-current power source 61. By controlling the direct-current voltage, the alternating current of the drive power source 63 is put in phase with the mechanical resonance frequency of the piezoelectric transducer 50, and ultrasonic vibration is efficiently raised.

However, the related-art piezoelectric transducer requires a fastening mechanism such as a bolt and nut combination. The structure of the piezoelectric transducer is thus limited. At the same time, the direct-current voltage should be applied to the piezoelectric element so as to control the resonance frequency of the piezoelectric transducer. The piezoelectric transducer must be mechanically highly precise to obtain a desired resonance frequency from its configuration. In the related art, the resonance frequency of the piezoelectric transducer cannot be adjusted freely in a wide range.

A known vibration control unit absorbs mechanical vibration by using a piece of rubber. Another known vibration control unit analyzes the phase, the amplitude and other conditions of the mechanical vibration, applies vibration of a phase opposite to that of the mechanical vibration to the mechanical component, and thus controls the mechanical vibration.

However, these related-art vibration control units fail to control a certain band of mechanical vibration occurring with the mechanical component.

For example, the former related-art vibration control unit using the piece of rubber can control the vibration in a wide frequency band. However, the vibration control unit cannot control the vibration of a specified small range of frequencies.

The related-art vibration control unit applying vibration from the outside requires a complicated structure so that the vibration control unit applies the vibration having a phase opposite to that of the mechanical vibration synchronously with the mechanical vibration. The vibration control unit requires an actuator for applying vibration from the outside, a sensor for detecting vibration, and a control circuit for executing high speed calculation. The vibration control unit thus requires an intricate, sophisticated, and large-sized structure, thereby occupying large space. However, the place where the vibration control unit is used is limited.

Conventionally, to obtain a desired frequency distribution, amplitude and other desired conditions of the mechanical vibration transmitted to a vibrating member, the configuration, material and other structural factors of the vibrating member are altered, and the vibrational characteristic of the vibrating member is adjusted.

However, in the above related art, the configuration, material and other structural factors need to be determined by means of calculation or actual measurement. It is thus difficult to adjust the frequency distribution and the amplitude of the mechanical vibration to a desired conditions.

The mechanical vibration transmitted to the vibrating member determines the structure of the vibrating member. When the vibrating member originally functions as a transmission, a support for other members, or the like, the design of the vibrating member is restricted within narrow limits.

At the same time, when the frequency distribution, the amplitude and other conditions of the mechanical vibration transmitted to the vibrating member vary, the vibrating member should be designed so that the vibrating member can correspond to variances of the vibration conditions. Such designing of the vibrating member is difficult. The vibrating member which can follow widely varied vibration conditions cannot be designed.

SUMMARY OF THE INVENTION

One object of the invention is to provide a piezoelectric transducer that can be designed without limitation and that can adjust its resonance frequency in a wide range without using a power source for controlling the resonance frequency.

Another object of the invention is to provide an ultrasonic motor that can transduce applied electricity into mechanical drive power efficiently by effectively using the piezoelectric transducer.

Another object of the invention is to provide a vibration control unit that can securely control the mechanical vibration of mechanical components.

Another object of the invention is to quantitatively control the frequency distribution and the amplitude of the mechanical vibration transmitted to a vibrating member.

These objects are achieved by a piezoelectric transducer. The piezoelectric transducer comprises a first electromechanical transducing element for transducing electric vibration into mechanical vibration, an elastic member mechanically connected to the first electromechanical transducing element, and a second electromechanical transducing element being mechanically connected to the elastic member and transducing mechanical vibration into electric vibration. The piezoelectric transducer further comprises an impedance element that is electrically connected to the second electromechanical transducing element and includes at least inductance.

In the ultrasonic motor of this invention, a third electromechanical transducing element may be added to the elastic member of the piezoelectric transducer. The third electromechanical transducing element applies vibration in the direction different from the direction in which the first electromechanical transducing element raises vibration. The ultrasonic motor further comprises a rotor contacting the elastic member.

DETAILED DESCRIPTION OF THE PREFERRED EMBODIMENT

FIRST EMBODIMENT

Figure 1:
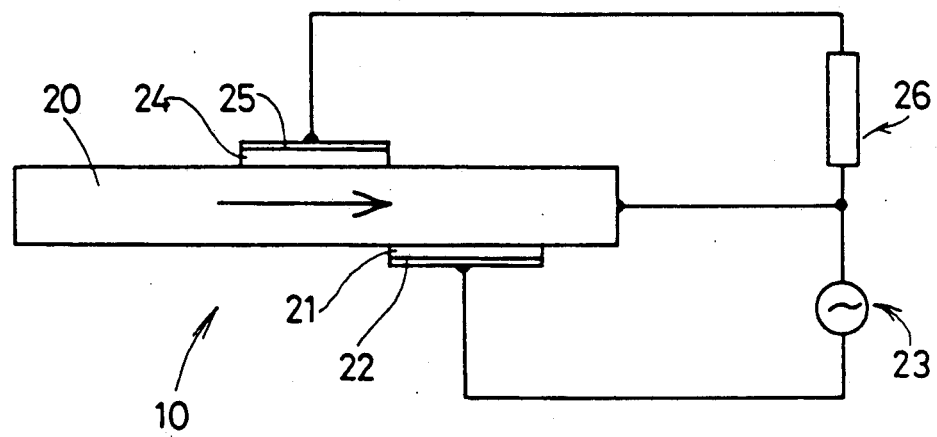
FIG. 1 is an explanatory drawing of a piezoelectric transducer of a first embodiment of this invention.

As shown in FIG. 1, a piezoelectric transducer 10 comprises a first piezoelectric member 21 on an elastic beam 20 so that the first piezoelectric member 21 excites the elastic beam 20. The elastic beam 20 also functions as a ground electrode. The first piezoelectric member 21 is vertically polarized in FIG. 1. The piezoelectric transducer 10 is constructed so that the first piezoelectric member 21 vibrates in a longitudinal vibration mode.

A driven electrode 22 is provided on the first piezoelectric member 21 and is connected to a drive power source 23.

A second piezoelectric member 24 for controlling resonance frequency is provided on the other side of the elastic beam 20. The positional relationship between the first and second piezoelectric members 21 and 24 is predetermined according to experiment. In the same way as the first piezoelectric member 21, the second piezoelectric member 24 is polarized in its thickness. A control electrode 25 is provided on the second piezoelectric member 24 and is connected to a variable-inductance coil 26.

The size and the configuration of the elastic beam 20 are predetermined so that the elastic beam 20 longitudinally vibrates at frequency $f_1$.

The second piezoelectric member 24 is arranged almost at the center of the elastic beam 20. Since the second piezoelectric member 24 is positioned close to the node of the elastic beam 20, a large variance of resonance frequency can be expected, even when the second piezoelectric member 24 expands and contracts slightly. According to the requirements of the piezoelectric effect and the range or the precision of the resonance frequency control executed by the second piezoelectric member 24, the position of the second piezoelectric member 24 can be altered. Multiple piezoelectric members can be arranged. Instead of a piezoelectric element, electrostrictive as well as magnetostrictive elements can be used for an electromechanical transducing element.

Figure 3:
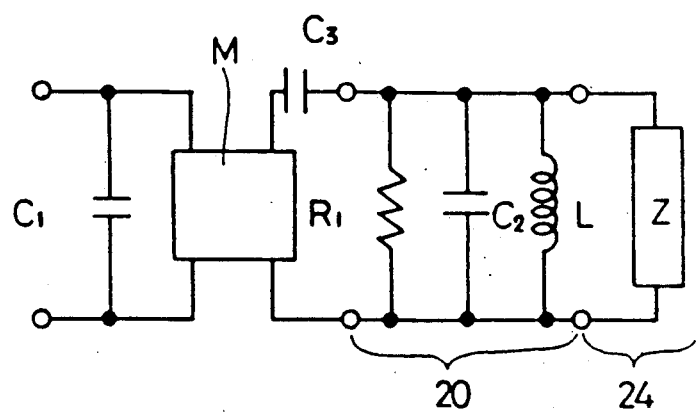
FIG. 3 is a diagram of an electric equivalent circuit of the piezoelectric transducer for the first embodiment.

FIG. 3 shows an electric equivalent circuit of the piezoelectric transducer 10, seen from the driven electrode 22. A capacitor $C_1$ and input terminals of a four-terminal network M with a power coefficient as a parameter are connected between the driven electrode 22 and the ground. A resistor $R_1$, a capacitor $C_2$, an inductor L, and a variable impedance Z are connected in parallel via a capacitor $C_3$ with two output terminals of the four-terminal network M. The value of resistor $R_1$ depends upon electric loss, the value of capacitor $C_2$ depends upon the elastic coefficient of the elastic beam 20, the value of inductor L depends upon the mass of the elastic beam 20, and the values of variable impedance Z depend upon the second piezoelectric member 24 and the variable-inductance coil 26. By changing the inductance of the variable-inductance coil 26, the mechanical resonance frequency of the piezoelectric transducer 10 can be altered. Thus, the resonance frequency of the elastic beam 20 of the piezoelectric transducer 10 without any load thereon can thus be adjusted. The variance in the resonance frequency, which occurs when a load is applied to the elastic beam 20 or an other driven member contacts the elastic beam 20, can also be corrected.

Figure 2:
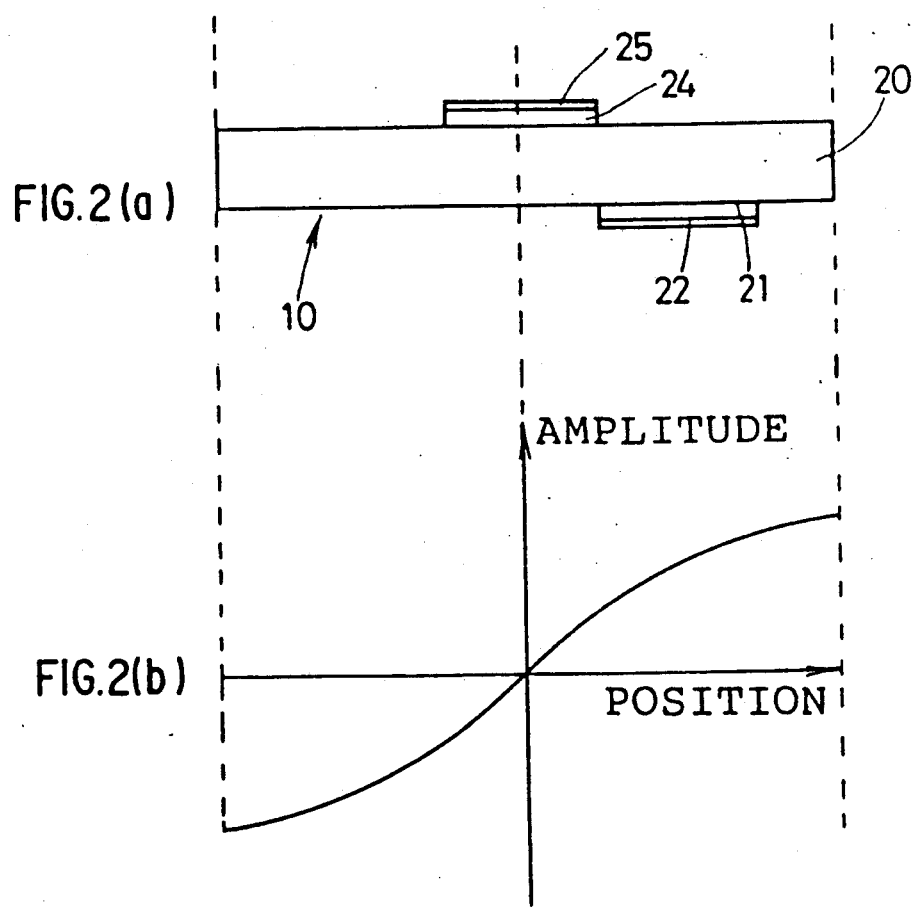
FIG. 2 is an explanatory drawing showing a distribution of an amplitude of the piezoelectric transducer for the first embodiment.

In operation, when the drive electric power 23 is energized at the frequency $f_1$ to vibrate the first piezoelectric member 21, the elastic beam 20 longitudinally vibrates at the frequency $f_1$. The elastic beam 20 vibrates at an amplitude as shown in FIG. 2. When the inductance of the variable-inductance coil 26 connected to the second piezoelectric member 24 is altered, the variable-inductance coil 26 antiresonates in parallel with the capacitance of the second piezoelectric member 24, thereby changing the elasticity of the second piezoelectric member 24. As a result, the resonance frequency of the piezoelectric transducer 10 can be adjusted, and the piezoelectric transducer 10 can resonate at a desired frequency $f_2$.

Figure 4:
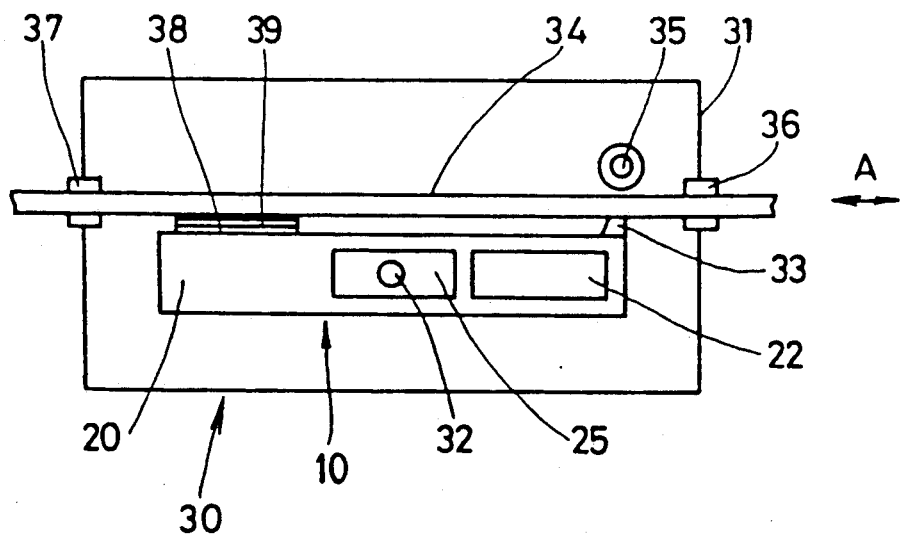
FIG. 4 is a side view diagram of an ultrasonic motor in which the piezoelectric transducer is applied.
Figure 5:
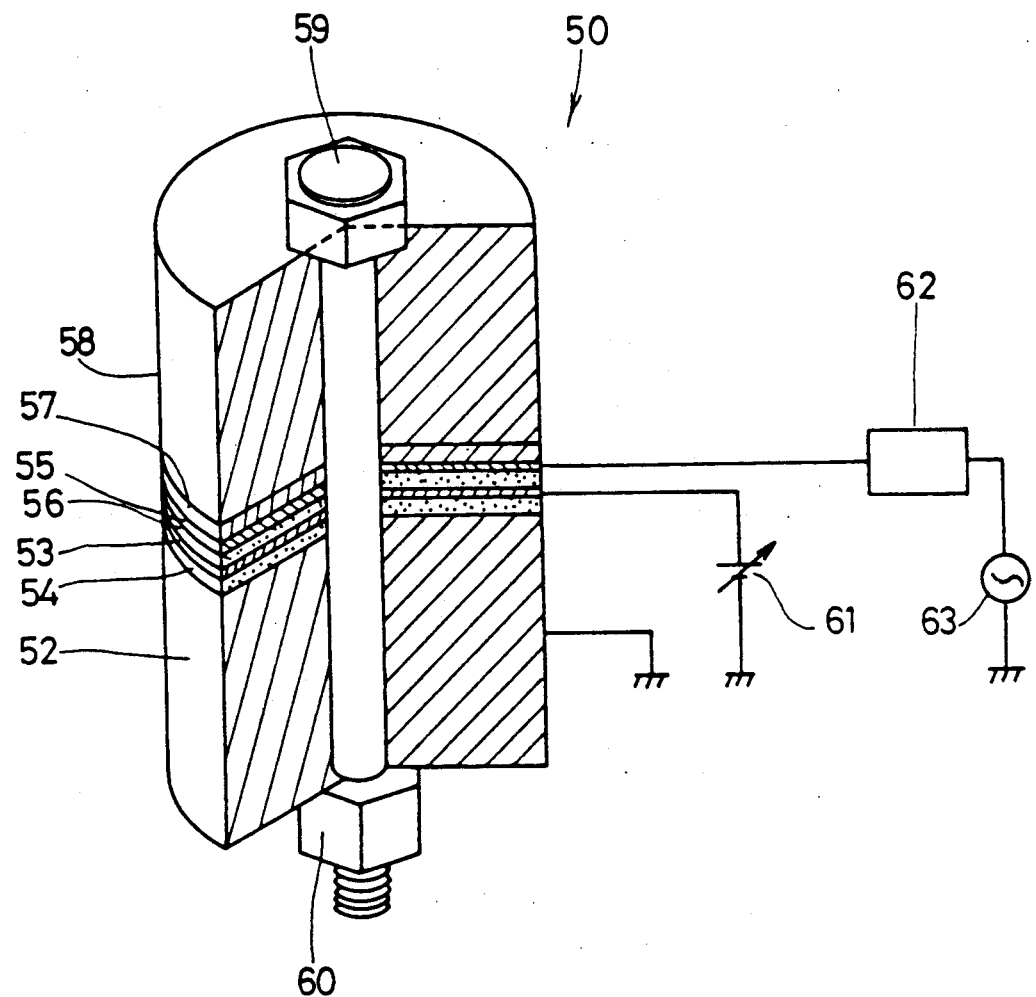
FIG. 5 is an explanatory drawing of a related-art piezoelectric transducer.

As shown in FIG. 4, a linear ultrasonic motor 30 of standing-wave type uses the piezoelectric transducer 10. In the linear ultrasonic motor 30 the piezoelectric transducer 10 on a support shaft 32 is fixed on a yoke 31.

A driven portion 33 is formed at the end of the piezoelectric transducer 10. A rubber roller 35 presses the rotor 34 against the driven portion 33.

The rotor 34 is supported by linear bearings 36 and 37 fixed on the yoke 31.

The elastic beam 20 has a third piezoelectric member 38 on a face almost at right angles with the face where the first piezoelectric member 21 is provided. Due to the third piezoelectric member 38, flexural vibration occurs with the elastic beam 20.

A driven electrode 39 is laid on the top end of the third piezoelectric member 38. In the linear ultrasonic motor 30, longitudinal vibration in a primary mode of the elastic beam 20 has a resonance frequency $f_1$, and flexural vibration in a secondary mode of the elastic beam 20 has a resonance frequency $f_2$. Since the support shaft 32 in the center of the elastic beam 20 is a node of these vibrations, the vibrations are not attenuated by the support shaft 32.

In this embodiment, the resonance frequency $f_1$ of the longitudinal vibration of the elastic beam 20 can be controlled to a given frequency in a wide range. The resonance frequency $f_1$ can easily correspond almost to the resonance frequency $f_2$ of the flexural vibration. As a result, the synthesis of the two different vibrations compose approximate elliptical vibration at the driven portion 33. The frictional force between the elastic beam 20 and the driven portion 33 results in a drive force, thereby moving the rotor 34 in a direction shown by an arrow A.

This embodiment is not limited to the vertical vibration in the primary mode or the flexural vibration in the secondary mode explained in the above. This embodiment can be applied for torsional vibration, shear vibration, multiple-frequency vibration and other vibrations.

The elastic member for this embodiment is beam-shaped. However, the elastic member can be a plate or a cylinder. The variable impedance element for this embodiment can include a variable capacitor.

In this embodiment, the variable-inductance coil 26 as the variable impedance element is manually adjusted. However, the variable impedance can be automatically adjusted using feedback control.

SECOND EMBODIMENT

Figure 6:
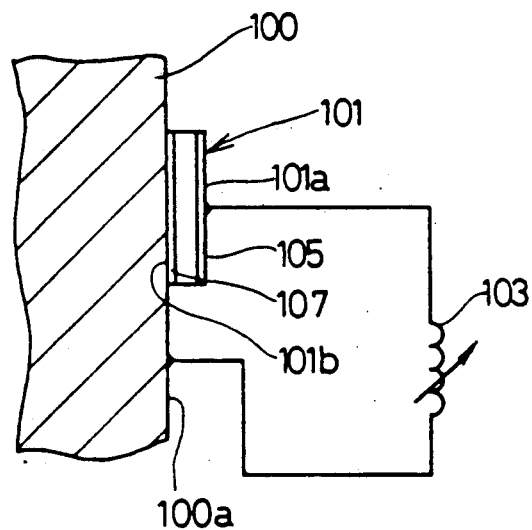
FIG. 6 is a block diagram of a vibration control unit for a second embodiment of this invention.

A vibration control unit for a second embodiment is explained referring to FIG. 6.

The vibration control unit controls the vibration of a conductive mechanical member 100. The vibration control unit comprises a piezoelectric element 101 bonded on the conductive mechanical member 100, and a variable coil 103 connected to an upper surface 101$a$ of the piezoelectric element 101 and a surface 100$a$ of the conductive mechanical member 100.

The piezoelectric element 101 is composed of Pb-zirconate titanate (PZT) and other substances. Electrodes 105 and 107 are provided, respectively, on upper and lower surfaces 101$a$ and 101$b$ of the piezoelectric element 101. The electrode 105 on the upper surface 101$a$ of the piezoelectric element 101 is directly connected to the variable coil 103. The electrode 107 on the lower surface 101$b$ of the piezoelectric element 101 is electrically connected via the conductive mechanical member 100 to the variable coil 103.

The variable coil 103 is provided with a mechanism for varying inductance by adjusting the length of the exposed core of the variable coil 103.

Figure 7:
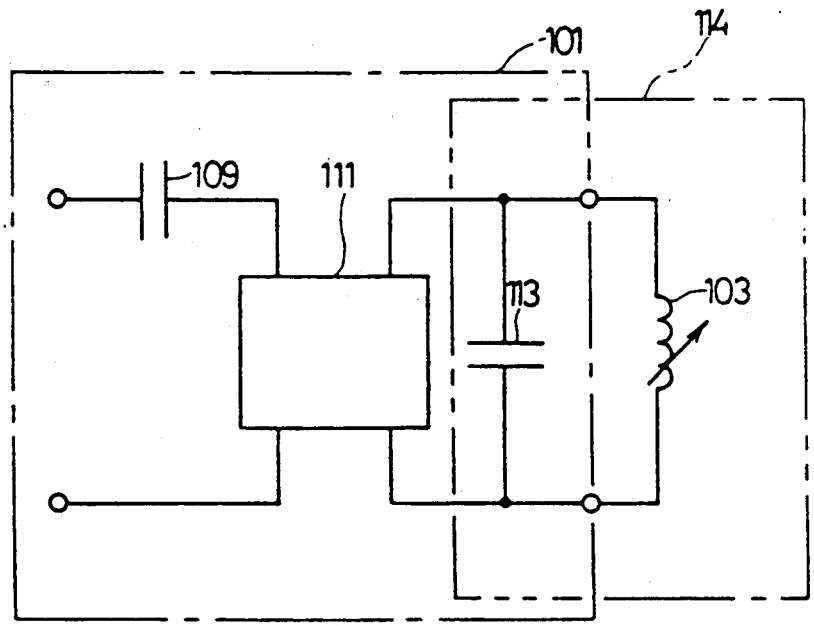
FIG. 7 is a block diagram of an electric equivalent circuit for the second embodiment.

In the electric equivalent circuit of the vibration control unit, as shown in FIG. 7, the piezoelectric element 101 is represented by capacitor 109, power supply 111 and capacitor 113. The capacitor 113 and the variable coil 103 composes a parallel circuit 114. The parallel circuit 114 has an antiresonance frequency fa obtained in the following equation:

$$fa = \tfrac{1}{2}\pi \sqrt{LC} \ [Hz]$$

In the equation, L denotes the inductance of the variable coil 103 and C denotes the capacitance of the variable coil 103.

In one cycle, the energy accumulated by the inductance of the variable coil 103 is greater than that consumed by the resistance of the variable coil 103.

In operation, the piezoelectric element 101 receives mechanical vibration of the conductive mechanical member 100 and generates voltage output having the same frequency as that of the mechanical vibration. The antiresonance frequency of the parallel circuit 114 composed of the capacitor 113 of the piezoelectric element 101 and the variable coil 103 corresponds to the frequency of the mechanical vibration. Therefore, the current flowing through the capacitor 113 is ahead of the variance of voltage output from the power supply 111 in phase by ninety degrees. The current flowing through the variable coil 103 is behind the variance of voltage output from the power supply 111 in phase by ninety degrees. Energy flows only between the capacitor 113 and the variable coil 103 when the antiresonance frequency of the parallel circuit 114 equals the frequency of the voltage output by power supply 111. Therefore, the parallel circuit 114 does not consume any power, thus preventing no current flows from the power supply 111 and the power supply 111 from transducing the energy generated by the mechanical vibration into electrical energy. The piezoelectric element 101 is thus prohibited from expanding or contracting, and the mechanical vibration of the conductive mechanical member 100 is controlled.

Figure 8:
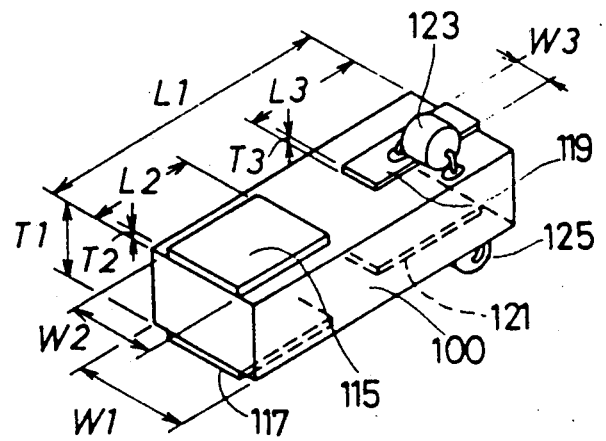
FIG. 8 is a perspective view of an experiment apparatus for the second embodiment.

Experiment results of the vibration control unit for this embodiment are now described. As shown in FIG. 8, a rectangular parallelepiped member of brass is used as the conductive mechanical member 100 for an experiment. Length L1 of the conductive mechanical member 100 is 60 mm, width W1 20 mm, and thickness T1 16 mm. Piezoelectric members 115 and 117 for causing vibration are bonded in parallel onto the surfaces of the conductive mechanical member 100. Length L2 of the piezoelectric elements 115 and 117 is 23 mm, width W2 13 mm, and thickness T2 1 mm. The piezoelectric elements 115 and 117 are connected to a circuit for generating high alternating voltage, thereby causing longitudinal vibration so that the conductive mechanical member 100 longitudinally vibrates at a frequency of about 28 KHz.

Piezoelectric elements 119 and 121 for controlling vibration are bonded onto the conductive mechanical member 100, at the end opposite from the piezoelectric elements 115 and 117, respectively, for causing vibration on the surfaces of the conductive mechanical component 100. The dimensions of the piezoelectric elements 119 and 121 are: length L3 is 25 mm, width W3 is 6 mm, and thickness T3 is 2 mm. The bottom surfaces of the piezoelectric elements 119 and 121 are electrically connected to the conductive mechanical member 100. Variable coils 123 and 125 are connected to the upper surfaces of the piezoelectric elements 119 and 121 and to the surfaces of the conductive mechanical member 100.

In the experiment, the inductance of variable coils 123 and 125 was gradually altered, and the amplitude of the mechanical vibration of the conductive mechanical member 100 was measured.

Figure 9:
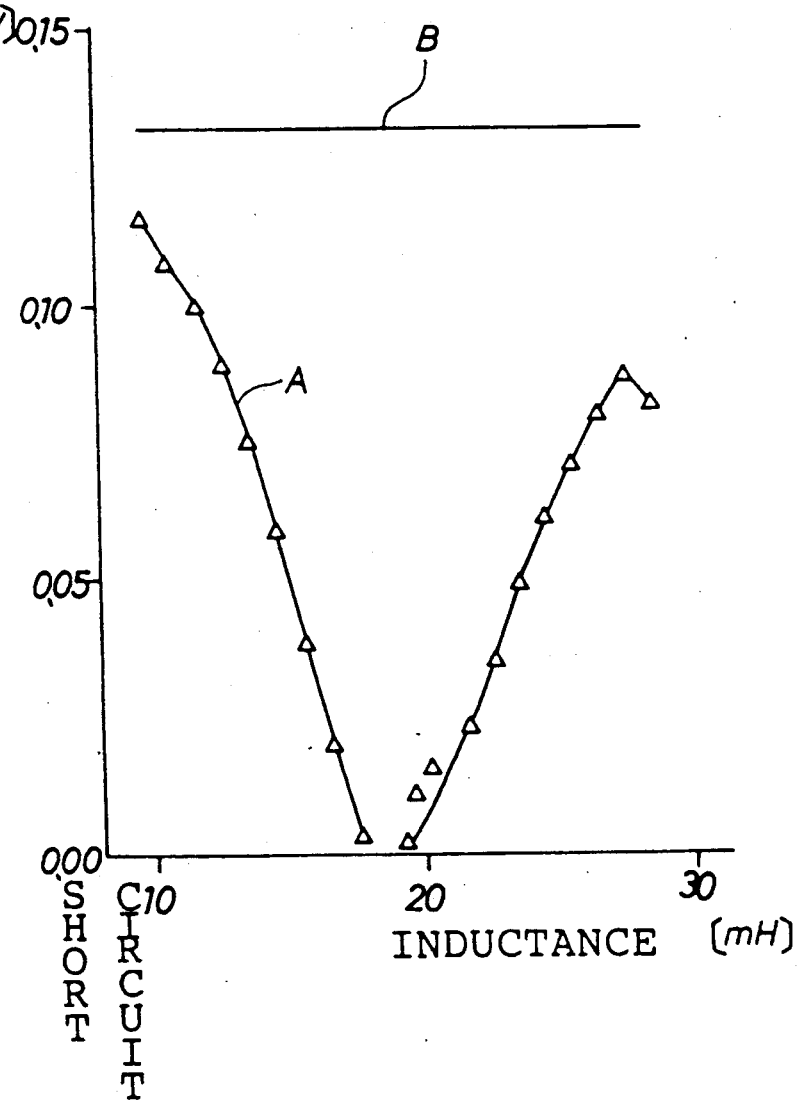
FIG. 9 is a graph showing experiment results.

Results in the graph of FIG. 9 were obtained from the experiment. In FIG. 9, the abscissa shows the inductance of the variable coils 123 and 125, and the ordinate shows the amplitude of the actual mechanical vibration which occurs with the conductive mechanical member 100 according to the voltage transmitted into the piezoelectric elements 115 and 117 for causing vibration. In FIG. 9, line A shows the execution of the vibration control by the vibration control unit. Solid line B shows the vibration the vibration control unit is stopped from controlling the mechanical vibration. As shown by the line A, when the inductance of the variable coils 123 and 125 is between 17 mH and 20 mH, the mechanical vibration of the conductive mechanical member 100 has the minimum amplitude. Since the amplitude is too small to measure near the inductance of 19 mH, the line A disappears for this inductance. When the inductance of the variable coils 123 and 125 is around 19 mH, the parallel circuit composed of the variable coils 123 and 125 and the capacitance of the piezoelectric elements 119 and 121 antiresonates against the mechanical vibration with the frequency of about 28 KHz. The mechanical vibration is thus controlled down to an unmeasurable value.

Even when the conductive mechanical member 100 vibrates at high frequency of about 28 KHz according to the applied voltage, as shown by the solid line A of the graph in FIG. 9, the vibration control unit can control the amplitude of the mechanical vibration of the conductive mechanical member 100 down to the minimum measurable value of 0.002 $\mu$m/V. This minimum value is one sixtieth of the amplitude of 0.132 $\mu$m/V shown by the solid line B where vibration control is not executed. On the other hand, when the frequency of the mechanical vibration is low, the vibration control unit can also control the mechanical vibration by adjusting the capacitance of the piezoelectric element 101 and the inductance of the variable coil 103 so that the antiresonance frequency of the parallel circuit corresponds to the frequency of the mechanical vibration. The vibration control unit for this embodiment can control the mechanical vibration regardless of the frequency of the mechanical vibration.

Even if the frequency of the mechanical vibration occurring with the conductive mechanical member 100 is not precisely known, the vibration control unit for this embodiment can control the mechanical vibration. The mechanical vibration can be controlled by adjusting the inductance of the variable coil 103 so that the antiresonance frequency of the parallel circuit corresponds to the frequency of the mechanical vibration.

Since the circuit composed of the piezoelectric element 101 and the variable coil 103 consumes no electric power, no circuit for a power source is required.

THIRD EMBODIMENT

Figure 10:
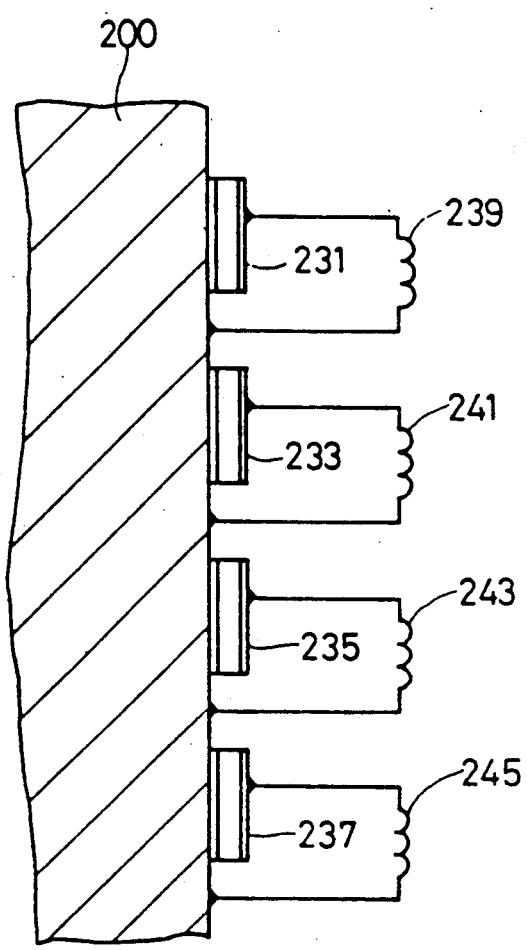
FIG. 10 is a block diagram of a vibration control unit for a third embodiment.

A vibration control unit for a third embodiment controls the mechanical vibration of a conductive mechanical member 200 in the same way as the second embodiment. As shown in FIG. 10, the vibration control unit comprises multiple piezoelectric elements 231, 233, 235 and 237 bonded onto the conductive mechanical member 200. The vibration control unit further comprises variable coils 239, 241, 243 and 245 connected to the upper surfaces of the piezoelectric elements 231, 233, 235 and 237 and the surface of the conductive mechanical member 200. The variable coils 239, 241, 243 and 245 differ from each other in inductance.

In the same way as the second embodiment, the piezoelectric elements 231, 233, 235 and 237 are composed of PZT and other substances. Electrodes are provided on the upper and lower surfaces of the piezoelectric elements 231, 233, 235 and 237. The electrodes on the upper surfaces of the piezoelectric elements 231, 233, 235 and 237 are directly connected to the variable coils 239, 241, 243 and 245. The electrodes on the lower surfaces of the piezoelectric elements 231, 233, 235 and 237 are electrically connected onto the conductive mechanical member 200 and are connected via the conductive mechanical member 200 to the variable coils 239, 241, 243 and 245.

The inductances of the variable coils 239, 241, 243 and 245 are adjusted by altering the number of turns, the cross-sectional area, the length of magnetic path, the length of the exposed core, or other conditions of the variable coils 239, 241, 243 and 245. Therefore, the inductances are different from each other by a predetermined value.

In the vibration control unit for the third embodiment, parallel circuits are composed of the variable coils 239, 241, 243 and 245 and the capacitances of the piezoelectric elements 231, 233, 235 and 237, respectively. The antiresonance frequencies of the respective parallel circuits differ from each other by a predetermined value. Consequently, the mechanical vibration of the conductive mechanical member 200 is controlled by the piezoelectric element 231, 233, 235 or 237 of the parallel circuit that has the antiresonance frequency almost corresponding to the frequency of the mechanical vibration. In the same way as the second embodiment, the vibration control unit for the third embodiment can control the mechanical vibration when the antiresonance frequency of either of the parallel circuits almost corresponds to the frequency of the mechanical vibration.

As aforementioned, the vibration control unit for the third embodiment can control the mechanical vibration occurring with the conductive mechanical member 200 in wide frequency bands.

In the vibration control unit for this embodiment, the variable coils 239, 241, 243 and 245, which are different from each other in inductance, form multiple parallel circuits different from each other in antiresonance frequency. Consequently, when the precise frequency of the mechanical vibration occurring with the conductive mechanical member 200 is not known or when the frequency of the mechanical vibration varies a little, the vibration control unit can reliably control the mechanical vibration.

Since the parallel circuits formed by the piezoelectric elements 231, 233, 235 and 237 and the variable coils 239, 241, 243 and 245 consume no electric power, no circuit for a power source is required in the same way as the second embodiment.

FOURTH EMBODIMENT

Figure 11:
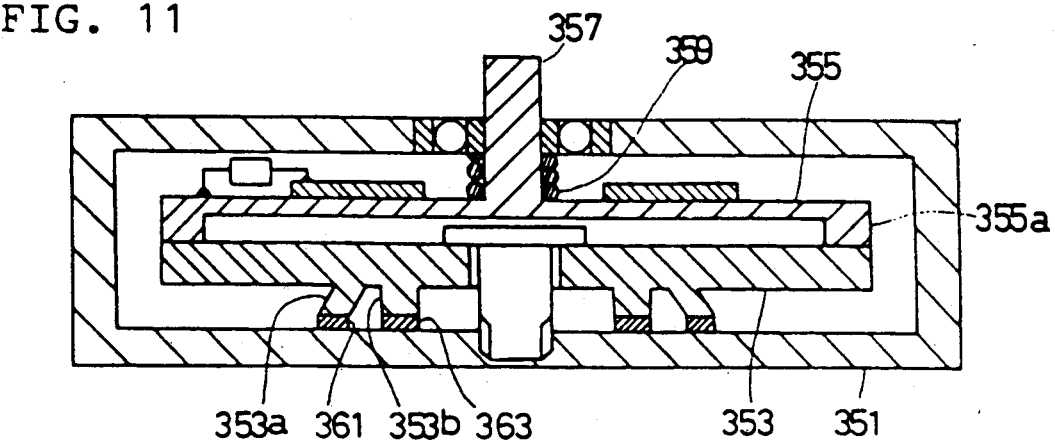
FIG. 11 is a cross-sectional view of an ultrasonic motor for a fourth embodiment in which the vibration control unit is applied.
Figure 12:
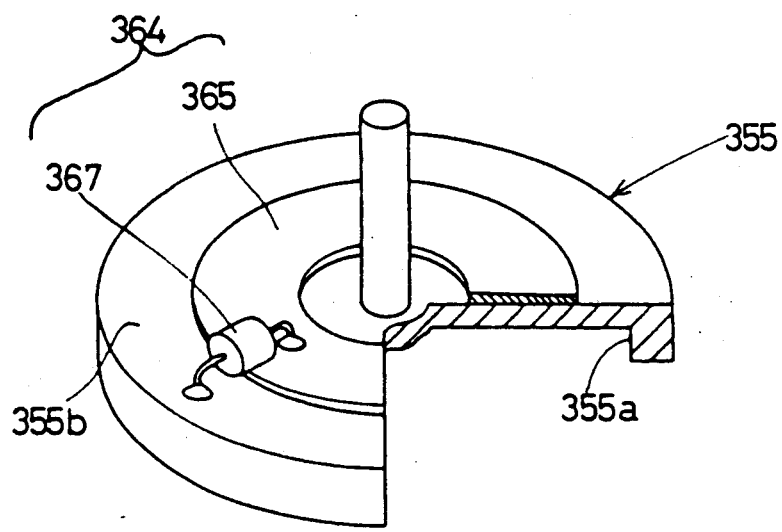
FIG. 12 is a perspective view of a rotor of the ultrasonic motor for the fourth embodiment.

As shown in FIGS. 11 and 12, in a fourth embodiment, a vibration control unit is applied onto an ultrasonic motor.

As shown in FIG. 11, the ultrasonic motor is a standing-wave rotary motor, and comprises a housing 351, a piezoelectric transducer 353 in the housing 351 and a rotor 355 rotatably supported in the housing 351. An output shaft 357 is an integral part of the rotor 355. A compression spring 359 interposes between the housing 351 and the rotor 355, pressing the rotor 355 onto the piezoelectric transducer 353.

The piezoelectric transducer 353 is disk-shaped. A piezoelectric element 361 attached to a ring projection 353a on the lower surface of the piezoelectric transducer 353 causes flexural vibration in an axial direction of the piezoelectric transducer 353. A piezoelectric element 363 attached to a ring projection 353b causes shear vibration in a peripheral direction of the piezoelectric transducer 353. By overlapping the flexural vibration and the shear vibration, elliptical vibration is generated at the material point of the piezoelectric transducer 353. A circuit for generating high alternating voltage is connected to the piezoelectric elements 361 and 363. The elastic coefficient and configuration of the piezoelectric transducer 353 are adjusted so that ultrasonic vibration with a predetermined frequency is obtained.

As shown in FIG. 12, the rotor 355 is disk-shaped. The output shaft 357 is provided in the center of the rotor 355. A contact portion 355a for contacting the piezoelectric transducer 353 is provided on the bottom periphery of the rotor 355.

On the other hand, a vibration control unit 364 is attached onto the rotor 355. The vibration control unit 364 comprises a circular piezoelectric element 365 attached to an upper surface 355b of the rotor 355 and a variable coil 367 connected to the circular piezoelectric element 365 and the rotor 355. The antiresonance frequency of the parallel circuit composed of the variable coil 367 and the capacitance of the circular piezoelectric element 365 corresponds to the frequency of the ultrasonic vibration generated by the piezoelectric transducer 353.

The circular piezoelectric element 365 is composed of PZT and other substances and is provided with electrodes on its both surfaces. The electrode on the surface of the circular piezoelectric element 365 is directly connected to the variable coil 367. On the other hand, the electrode on the rear face of the piezoelectric element 365 is connected via the rotor 355 to the variable coil 367 by electrically contacting the rotor 355 which is conductive. When the rotor 355 is of non-conductive material, the electrode on the rear face of the piezoelectric element 365 can be directly connected to the variable coil 367.

The variable coil 367 is provided with a variable mechanism in which the inductance of the variable coil 367 can be altered by adjusting the length of the exposed core of the variable coil 367.

In operation, the piezoelectric transducer 353 generates ultrasonic vibration with a predetermined frequency. When elliptical movement occurs at respective material points on the face of the piezoelectric transducer 353 opposed to the rotor 355, the respective material points contact the contact portion 355a of the rotor 355 for a moment. Due to the friction caused by such contacting, the rotor 355 is repeatedly rotated a little. The rotor 355 thus continuously rotates, thereby rotating the output shaft 357 integrally formed in the rotor 355.

If the rotor 355 resonates with the ultrasonic vibration, the piezoelectric transducer 353 insufficiently contacts the rotor 355. As a result, the force obtained from the ultrasonic vibration is ineffectively and unstably transmitted to the rotor 355, or energy leaks out of the rotor 355 due to the vibration of the rotor 355.

In this embodiment, when the rotor 355 starts vibrating due to the ultrasonic vibration, the vibration control unit 364 attached to the rotor 355 prohibits the rotor 355 from vibrating. Specifically, when the piezoelectric element 365 receives the vibration of the rotor 355 and starts generating the voltage output having the same frequency as that of the vibration of the rotor 355, the parallel circuit composed of the variable coil 367 and the capacitance of the piezoelectric element 365 functions in the same way as the second embodiment. The piezoelectric element 365 is thus prevented from expanding and contracting. Consequently, the vibration of the rotor 355 with the piezoelectric element 365 is controlled.

In the ultrasonic motor provided with the vibration control unit, the rotor 355 is prevented from vibrating. The piezoelectric transducer 353 sufficiently contacts the rotor 355. Such contacting generates friction, and the force from the ultrasonic vibration is efficiently transmitted to the rotor 355, thereby rotating the rotor 355.

The vibration control unit 364 composed of the piezoelectric element 365 and the variable coil 367 is so simple in structure, compact and lightweight that the vibration control unit 364 can be easily positioned between the rotor 355 and the housing 351. The installation of the vibration control unit 364 has no influence on the dynamic characteristic of the ultrasonic motor.

Figure 13:
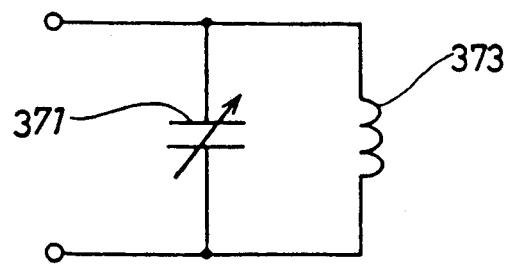
FIG. 13 is a circuit diagram showing another example of impedance.

In the second, third and fourth embodiments, the vibration control unit comprises the electromechanical transducing element. However, instead of the element, an electrostrictive element, a magnetostrictive element or other elements for transducing energy from mechanical vibration to electric vibration will suffice for the present invention. The vibration control unit also comprises the impedance element. As shown in FIG. 13, the impedance element can be composed of a variable capacitance 371 juxtaposed with a coil 373. The parallel circuit is substantially composed of the reactance and impedance element of the electromechanical transducing element. The impedance element can include a little resistance.

FIFTH EMBODIMENT

Figure 15:
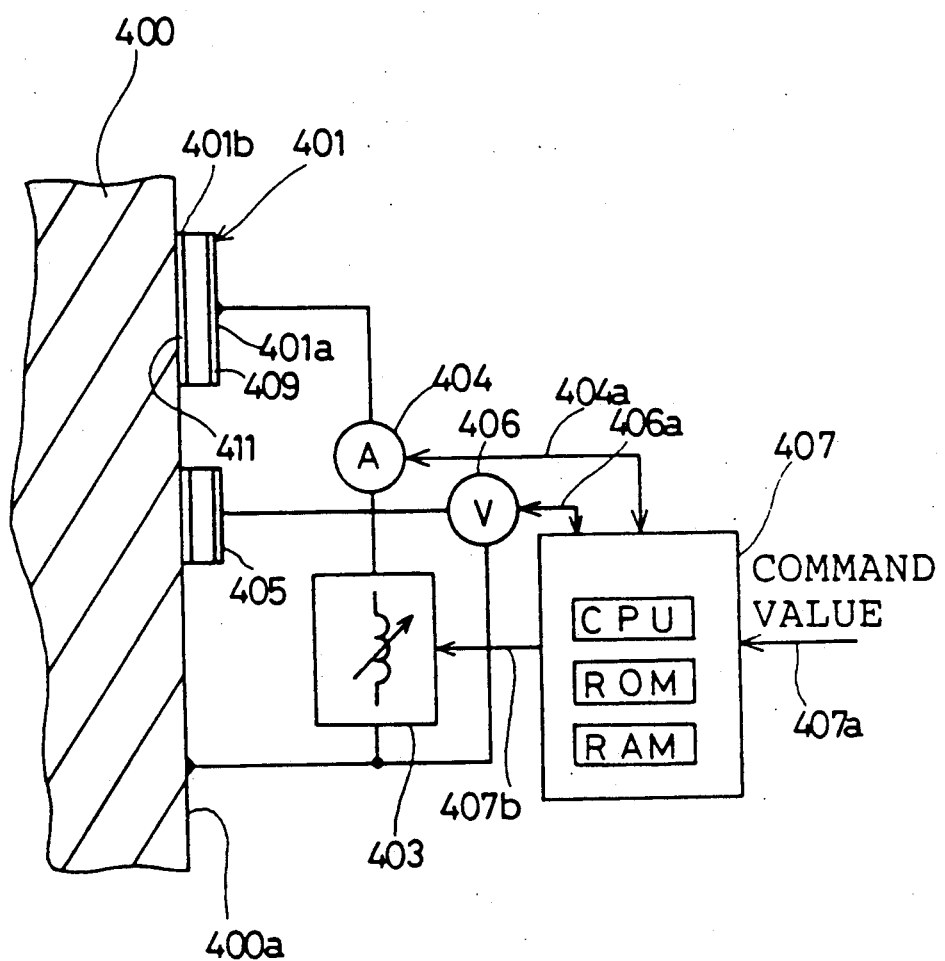
FIG. 15 is a block diagram of a vibration control unit for a fifth embodiment of this invention.

As shown in FIG. 15, a vibration control unit for a fifth embodiment controls the mechanical vibration of a conductive vibrating member 400. A closed circuit is formed by a piezoelectric element 401 bonded to the conductive vibrating member 400 and a variable coil 403 connected to an upper surface 401a of the piezoelectric element 401 and a surface 400a of the conductive vibrating member 400. In the closed circuit, an ammeter 404 for measuring the strength of an electric current flowing through the closed circuit is connected in series with the variable coil 403. A sensor 405 consisting of, for example, a piezoelectric element, which detects the amplitude of the mechanical vibration of the conductive vibrating member 400, is bonded onto the conductive vibrating member 400 and is connected to a voltmeter 406. The ammeter 404 and the voltmeter 406 are both connected to a control unit 407. The control unit 407 is connected to a variable mechanism in the variable coil 403, thus adjusting the inductance of the variable coil 403.

The piezoelectric element 401 is composed of PZT and other substances. The piezoelectric element 401 has electrodes 409 and 411 on upper and lower surfaces 401a and 401b, respectively. The electrode 409 on the upper surface 401a of the piezoelectric element 401 is directly connected to the variable coil 403. The electrode 411 on the lower surface 401b is connected via the conductive vibrating member 400 to the variable coil 403 by electrically contacting the conductive vibrating member 400.

In the variable mechanism of the variable coil 403, the inductance is altered by adjusting the length of the exposed core of the variable coil 403. The variable mechanism adjusts the inductance of the variable coil 403 according to a control signal from the control unit 407.

The sensor 405 for detecting the amplitude of the mechanical vibration delivers the voltage corresponding to the amplitude of the mechanical vibration of the conductive vibrating member 400.

The control unit 407 is a microcomputer containing a CPU, a ROM and a RAM, and functions according to predetermined procedure. Signal conductors 404a and 406a connect the ammeter 404 and the voltmeter 406, respectively, to the control unit 407. At the same time, a command conductor 407a is connected from outside equipment such as a keyboard to the control unit 407. The control unit 407 is connected through an output line 407b to the variable mechanism of the variable coil 403.

Figure 16:
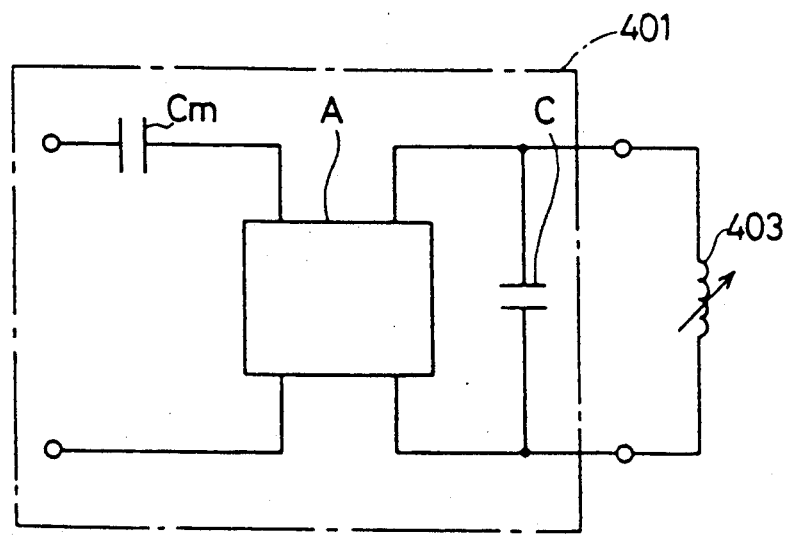
FIG. 16 is a block diagram showing the electric equivalent circuit of the closed circuit.

FIG. 16 shows an electric equivalent circuit of the closed circuit composed of the piezoelectric element 401 and the variable coil 403. The piezoelectric element 401 is represented by mechanical compliance Cm, power coefficient A and capacitance C. The closed circuit has a resonance frequency fr obtained in the following equation:

$$fr = \tfrac{1}{2}\pi \sqrt{L(A^2 Cm + C)} \ [Hz]$$

An antiresonance frequency fa is obtained from the following equation:

$$fa = \tfrac{1}{2}\pi \sqrt{LC} \ [Hz]$$

In the above equation L denotes the inductance of the variable coil 403.

The vibration control unit 407 controls the variable mechanism of the variable coil 403 according to predetermined procedure based on feedback such as the command value from the outside equipment, the current detected by the ammeter 404 and the voltage detected by the voltmeter 406. The inductance of the variable coil 403 is thus adjusted. As a result, the antiresonance characteristic of the closed circuit composed of the piezoelectric element 401 and the variable coil 403 is changed, and the mechanical vibration of the conductive mechanical member 400 is controlled.

Figure 17:
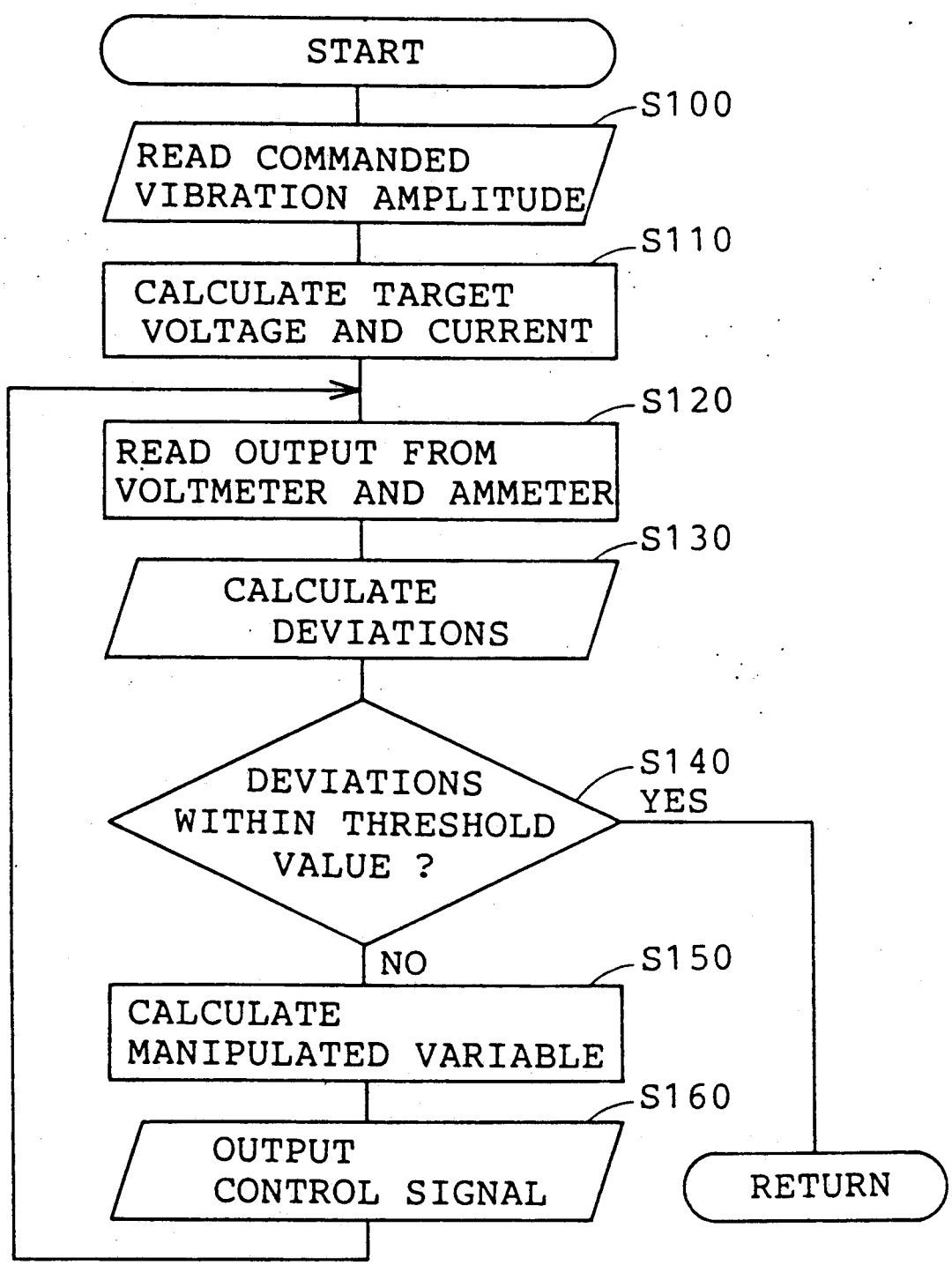
FIG. 17 is a flowchart of a process executed by the vibration control unit of the fifth embodiment.

According to a process shown in a flowchart of FIG. 17, when the frequency of the mechanical vibration occurring with the conductive vibrating member 400 varies, the control unit 407 controls the amplitude of the mechanical vibration according to the command value. The process is repeatedly executed at a predetermined interval.

After the control unit 407 starts the process, at step S100 a designated vibration amplitude is read as a command value from the outside equipment like the keyboard. Subsequently, at step S110 target voltage and current are calculated corresponding to the read command value. The target voltage is the target value of the output voltage from the sensor 405. On the other hand, the target current is the target value of the electric current flowing through the closed circuit composed of the piezoelectric element 401 and the variable coil 403. The target voltage and current are obtained referring to a data table explained below.

The data table shows the relationship between the vibration amplitude of the vibrating member 400 and the combined data of target voltage and current. From the data table, a correlation between the vibration amplitude of the vibrating member 400 and the resonance characteristic of the closed circuit is obtained. As aforementioned, when the frequency band of the mechanical vibration of the vibrating member 400 deviates from the frequency band of the resonance characteristic of the closed circuit, the vibration amplitude of the vibrating member 400 changes. The correlation between the vibration amplitude of the vibrating member 400 and the resonance characteristic of the closed circuit can be obtained through experiment or other methods. Therefore, a data table is established in which the vibration amplitude of the vibrating member 400 is determined according to the resonance characteristic of the closed circuit composed of the piezoelectric element 401 and the variable coil 403.

On the other hand, the resonance characteristic of the closed circuit is specified according to the combined data of the target voltage and current. When the resonance frequency fr or the antiresonance frequency fa of the closed circuit approaches the frequency of the mechanical vibration occurring with the vibrating member 400, the strength of the electric current flowing through the closed circuit increases. More specifically, when the resonance frequency fr of the closed circuit approaches the frequency of the mechanical vibration of the conductive mechanical member 400, the amplitude of the mechanical vibration is increased. When the antiresonance frequency fa of the closed circuit approaches the frequency of the mechanical vibration, the amplitude of the mechanical vibration is depressed. In both cases, the strength of the electric current flowing through the closed circuit is increased. Therefore, the resonance characteristic of the closed circuit ranging from the resonance frequency fr to the antiresonance frequency fa cannot be specified only from the electric current through the closed circuit. However, the combining of the electric current with the voltage output from the sensor 405 for detecting the amplitude of the mechanical vibration can determine the resonance characteristic of the closed circuit in a wide range from the resonance frequency fr to the antiresonance frequency fa. Therefore, in the data table, the target voltage and current are arranged corresponding to the amplitude of the mechanical vibration occurring with the conductive vibrating member 400.

At step S110, referring to the data table, the target voltage and current are calculated corresponding to the command value from the outside equipment. Subsequently, at step S120 output current and voltage from the ammeter 404 and the voltmeter 406, respectively, are read. At step S130, a current deviation of the output current from the target current is calculated, and a voltage deviation of the output voltage from the target voltage is also calculated. Subsequently, it is determined at step S140 whether the current and voltage deviations calculated at step S130 are within predetermined threshold values. When at step S140 the current and voltage deviations are within the threshold values, it is determined that the amplitude of the mechanical vibration with the conductive vibrating member 400 is allowable within the command value from the outside. The process once ends here, and is repeatedly executed at the predetermined interval.

On the other hand, when either or both of the current and voltage deviations are out of the threshold value, and the determination of the step S140 is negative, the process goes to step S150. At step S150 a manipulated variable of the variable mechanism in the variable coil 403 is calculated corresponding to both the current and voltage deviations. Specifically, at step S150 it is determined based on plus or minus sign of the current and voltage deviations whether the inductance of the variable coil 403 should be increased or decreased. It is also calculated based on the values of the current and voltage deviations by what degree the inductance should be increased or decreased.

After the manipulated variable is calculated at step S150, at step S160 the manipulated variable is transmitted to the variable coil 403 as a control signal, and the process goes back to step S120 where the output voltage and current are read.

Steps S120 through S150 form a looped process for adjusting the output voltage of the voltmeter 406 and the output current of the ammeter 404 to the target voltage and current. The looped process is repeatedly executed until the current and voltage deviations come within the threshold values. When the current and voltage deviations are in the range of the threshold values, and the answer at step S140 is affirmative, the process in the flowchart of FIG. 17 once ends. The process is repeatedly executed at the predetermined interval. Through the process the command value is read and the vibration amplitude of the vibrating member 400 is controlled according to the command value.

Figure 14:
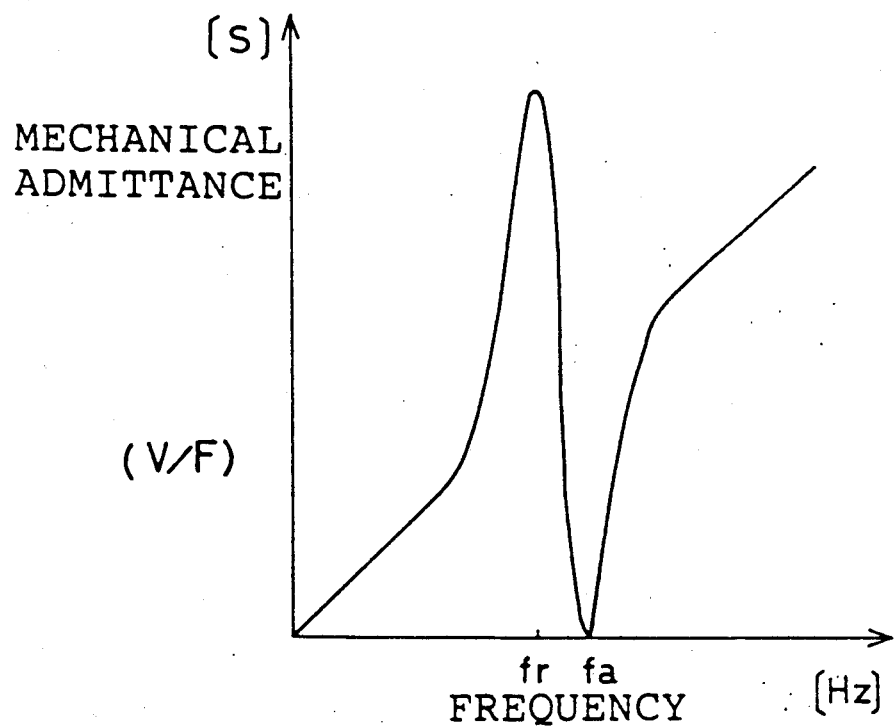
FIG. 14 is a graph showing the relationship between resonance characteristic of a closed circuit and mechanical admittance.

In this embodiment the resonance characteristic of the closed circuit is adjusted, thereby changing the relationship of the frequency distribution of the closed circuit with that of the mechanical vibration occurring with the conductive vibrating member 400. The amplitude of the mechanical vibration of the conductive vibrating member 400 is thus controlled according to the command value. As shown in the graph of FIG. 14, the condition created in the closed circuit changes according to the frequency of the mechanical vibration of the conductive vibrating member 400. In one condition, the piezoelectric element 401 has the minimum value of speed V at which the piezoelectric element 401 expands and contracts, and the piezoelectric element 401 is almost prohibited from expanding and contracting. In another condition, the piezoelectric member 401 has the maximum value of the speed V and can easily expand and contract. As a result, the vibrating member 400 provided with the piezoelectric element 401 is prohibited from vibrating or can easily vibrate depending on the speed V at which the piezoelectric element 401 expands and contracts. Consequently, the resonance characteristic of the closed circuit is adjusted, thereby changing how the frequency, including the antiresonance frequency fa and the resonance frequency fr, of the closed circuit corresponds to the frequency of the mechanical vibration occurring with the conductive vibrating member 400. The amplitude of the mechanical vibration is thus controlled according to the command value.

In the vibration control unit of this embodiment, the control unit 407 controls the resonance characteristic of the closed circuit composed of the piezoelectric element 401 and the variable coil 403. Consequently, when the mechanical vibration of the vibrating member 400 varies in its frequency, the amplitude of the mechanical vibration can be quantitatively controlled according to the command value. The variance of the conductive vibrating member 400 in its design is secured. At the same time, the vibrational mode of the vibrating member 400 can be controlled.

The electromechanical transducing element attached to the vibrating member 400 is not limited to the piezoelectric element. Instead of the piezoelectric element, an electrostrictive element, a magnetostrictive element, or other elements for transducing energy from mechanical vibration into electric vibration can be used. The impedance element composing the closed circuit is not limited to the variable coil. Variable capacitance can be connected in parallel to the variable coil. In the fifth embodiment, the amplitude of the mechanical vibration of the conductive vibrating member 400 is quantitatively controlled. However the frequency distribution of the mechanical vibration of the vibrating member 400 can be quantitatively controlled, because under the control of the amplitude of the mechanical vibration, in this embodiment, the frequency distribution changes. In the fifth embodiment, control for depressing the mechanical vibration as well as control for easily generating the mechanical vibration can be executed. These controls are based on the output voltage from the sensor 405 and the electric current flowing through the closed circuit. When the control unit executes only one of the controls, only the electric current flowing through the closed circuit can be controlled. In the fifth embodiment, when the voltage deviation of the output voltage of the voltmeter 406 from the target voltage and current deviation of the output current of the ammeter 404 from the target current come in the range of the threshold values, the control process once ends. The control process is executed again at a predetermined interval. The control process is not limited to this embodiment. For example, in another embodiment, feedback control is continuously executed for a predetermined time period so that the voltage and current deviations are in the range of the threshold values. After the predetermined time period elapses, the command value is updated and the feedback control is executed based on the updated command value.

Although specific embodiments of the invention have been shown and described for the purpose of illustration, the invention is not limited to the embodiments illustrated and described. This invention includes all embodiments and modifications that come within the scope of the claims.

What is claimed is:

1. A vibration control device for controlling the vibration of a vibrating body, comprising:
   an electromechanical transducing element attached to the vibrating body for generating electrical energy from the vibration of the vibrating body;
   an electrical circuit comprising an impedance element including at least an inductor, electrically connected to the electromechanical transducing element; and
   a resonance characteristic control means for adjusting an antiresonance frequency of the impedance element such that the mechanical resonance characteristic of the vibrating body is substantially the same as a target value, said control means adjusting said antiresonance frequency of the impedance element using feedback control based upon a command value representing a designated vibration amplitude as said resonance characteristic.

2. The vibration control device of claim 1, in which the inductor has a variable inductance.

3. The vibration control device of claim 1, in which the impedance element further includes a capacitor.

4. The vibration control device of claim 2, in which the impedance element further includes a capacitor having a variable capacitance.

5. The vibration control device of claim 2, in which the inductor and the capacitor are connected in parallel to the electromechanical transducing element.

6. The vibration control device of claim 1, in which an antiresonating frequency of the electrical circuit is substantially the same as a frequency of mechanical vibration of the vibrating body.

7. The vibration control device of claim 1, in which the electromechanical transducing element is attached to the vibrating body such that a change in the physical properties of the electromechanical transducing device changes the resonance frequency of the vibrating body.

8. The vibration control device of claim 1, in which a plurality of electromechanical transducing elements, each with an associated impedance element, are attached to the vibrating body.

9. The vibration control device of claim 8, in which the impedance elements of each of the plurality of electromechanical transducing elements have different antiresonance frequencies such that the vibration of the vibrating body is controlled over a range of mechanical vibration frequencies.

10. The vibration control device of claim 1, in which the inductor has a variable inductance and the resonance characteristic control means adjusts the antiresonance frequency of the impedance element by adjusting the inductance of the inductor.

11. The vibration control device of claim 1, in which the vibrating body further comprises an electromechanical transducing element for generating the vibration of the vibrating body from electrical energy and an elastic body mechanically connected with the electromechanical transducing element for generating the vibration of the vibrating body from electrical energy.

12. The vibration control device of claim 11, in which the elastic body is provided with an electromechanical transducing element for generating vibration having a direction different from that of the vibration generated by the electromechanical transducing element for generating the vibration of the vibrating body from electrical energy.

13. A vibration control device according to claim 1, wherein a target current and a target voltage are determined from said command value, and said impedance element is adjusted to maintain a measured current in the circuit and a measured voltage from a vibration sensor attached to the vibrating body equal to said target current and voltage, respectively, with a predetermined tolerance.

14. A controllable vibrating device comprising:
   an elastic member;
   a first electromechanical transducing element attached to said elastic member for generating mechanical vibration from applied electrical energy;
   a second electromechanical transducing element attached to said elastic member; and
   a variable inductor impedance element connected with said second electromechanical transducing element and forming a closed electrical circuit, said closed electrical circuit forming an antiresonance signal means applying an antiresonance signal having a frequency substantially equal to the frequency of vibration of the vibrating device, wherein a frequency of a signal of the closed circuit alters the resonant vibrating frequency of the vibrating device.

15. A vibrating device according to claim 14, wherein said elastic member serves as a ground electrode in said circuit.

16. A vibrating device according to claim 14, wherein said elastic member is an elastic beam and said second electromechanical transducing element is located substantially at the center of said beam.

17. A vibrating device according to claim 16, wherein said first electromechanical transducing element is arranged to vibrate in a longitudinal direction of said beam.

18. A vibrating device according to claim 14, wherein said first and second electromechanical transducing elements are piezoelectric elements.

19. A vibration control device for controlling ultrasonic vibration of a vibrating body, comprising:
   electromechanical transducing means attached to the vibrating body for converting energy from mechanical vibration into electrical vibration and vice versa; and
   antiresonance signal means comprising a closed electrical circuit connecting said electromechanical transducing means to an impedance element, said antiresonance signal means applying to said electromechanical transducing means an antiresonance signal having a frequency substantially equal to the frequency of the ultrasonic vibration of said vibrating body, said impedance element including a variable coil and a variable capacitance.

20. The vibration control device of claim 19, wherein the electrical circuit is formed so that an antiresonance frequency thereof, at which an admittance determined by an inductance of the variable coil and a capacitance of the electromechanical transducing means reaches a minimum value, is substantially equal to the frequency of the vibration of the vibrating body.

21. An ultrasonic motor comprising:
   an ultrasonic vibrator for generating an ultrasonic vibration;
   a movable member with a contact portion for contacting the ultrasonic vibrator;
   electromechanical transducing means attached to said movable member for converting energy from mechanical vibration into electrical vibration and vice versa; and
   antiresonance signal means comprising a closed electrical circuit connecting said electromechanical transducing means to an impedance element, said antiresonance signal means applying to said electromechanical transducing means an antiresonance signal having a frequency substantially equal to the frequency of the vibration of said ultrasonic vibrator, said impedance element including a variable coil and a variable capacitor.

22. An ultrasonic motor according to claim 21, wherein said motor is a linear ultrasonic motor.

23. The ultrasonic motor of claim 21, wherein the movable member is a rotor rotatably supported in a housing of the ultrasonic motor.

24. The ultrasonic motor of claim 23, wherein the electromechanical transducing means is attached to the rotor and is formed in a circular shape.

25. The ultrasonic motor of claim 21, wherein the electric circuit is formed so that an antiresonance frequency of said signal, at which an admittance determined by an inductance of the inductor and a capacitance of the electromechanical transducing means reaches a minimum value, is substantially equal to the frequency of the vibration of the ultrasonic vibrator.

26. A vibration control device for controlling ultrasonic vibration of a vibrating body, comprising:
   a plurality of electromechanical transducing means attached to the vibrating body for converting energy from mechanical vibration into electrical vibration and vice versa; and
   a plurality of antiresonance signal means for applying to said electromechanical transducing means antiresonance signals having frequencies substantially equal to the frequency of the ultrasonic vibration of the vibrating body, said antiresonance signal means having different resonance frequencies within a predetermined range such that a range of ultrasonic vibration of said vibrating body can be suppressed.

* * * * *